(12) United States Patent
Shimazu et al.

(10) Patent No.: US 6,373,991 B1
(45) Date of Patent: Apr. 16, 2002

(54) METHOD OF AND APPARATUS FOR INTERPOLATING GRADATION LEVELS OF IMAGE

(75) Inventors: Shigeaki Shimazu; Souichi Kimura, both of Kyoto; Tetsuo Asano, Osaka, all of (JP)

(73) Assignee: Dainippon Screen Mfg., Co., Ltd., Kyoto (JP)

( * ) Notice: Subject to any disclaimer, the term of this patent is extended or adjusted under 35 U.S.C. 154(b) by 0 days.

(21) Appl. No.: 08/978,428

(22) Filed: Nov. 25, 1997

(30) Foreign Application Priority Data

Nov. 27, 1996 (JP) .............................. 8-316431

(51) Int. Cl.[7] .............................. G06T 5/00; G06T 5/20
(52) U.S. Cl. ........................ 382/266; 382/274; 382/275; 382/300; 382/169
(58) Field of Search .................... 382/266, 269, 382/274, 275, 254, 300, 169, 168; 358/455, 447

(56) References Cited

U.S. PATENT DOCUMENTS 5,054,100 A * 10/1991 Tai ............................. 382/300
5,768,482 A * 6/1998 Winter et al. ................. 358/1.9

* cited by examiner

*Primary Examiner*—Scott Rogers
(74) *Attorney, Agent, or Firm*—McDermott, Will & Emery

(57) ABSTRACT

Interpolation of gradation levels of an image without degradation of the quality of the image is disclosed. The image is searched in the vertical direction from an objective pixel (Pt) to be subjected to the gradation level interpolation for a high-level pixel (Pvh) located closest to the objective pixel (Pt), and then searched in the horizontal direction from the objective pixel (Pt) for a high-level pixel (Phh) located closest to the objective pixel (Pt). A comparison is made between the high-level pixels (Pvh, Phh) to determine the distance from the objective pixel (Pt) to one of the high-level pixels which is closer to the objective pixel (Pt) as a high-level distance ($D_{high}$). Similar operation is performed to extract low-level pixels (Pvl, Phl), and a comparison is made therebetween to determine a low-level distance ($D_{low}$). The gradation level of the objective pixel (Pt) is determined based on the high-level distance ($D_{high}$) and low-level distance ($D_{low}$).

10 Claims, 17 Drawing Sheets

OBJECTIVE BUFFER

IMAGE

HIGH-LEVEL ADJACENT
PIXEL VERTICAL
DISTANCE BUFFER

HIGH-LEVEL ADJACENT
PIXEL HORIZONTAL
DISTANCE BUFFER

LOW-LEVEL ADJACENT
PIXEL VERTICAL
DISTANCE BUFFER

LOW-LEVEL ADJACENT
PIXEL HORIZONTAL
DISTANCE BUFFER

METHOD OF AND APPARATUS FOR INTERPOLATING GRADATION LEVELS OF IMAGE

BACKGROUND OF THE INVENTION

1. Field of the Invention

The present invention relates to a method of and apparatus for interpolating gradation levels of an image for digital image data processing.

2. Description of the Background Art

Digital image data subjected to various types of image processing are sometimes lacking in gradation levels. For example, the lack of gradation levels occurs when gradation correction using a tone curve and contrast correction using a histogram are made to digital image data.

FIGS. 23A, 23B, and 23C illustrate the gradation correction using a tone curve. It is assumed that the gradation levels of all pixels included in inputted digital image data are determined to produce a histogram shown in FIG. 23A which illustrates the number of pixels versus gradation levels. Gradation correction is made based on a tone curve tc as shown in FIG. 23B to increase the brightness of the full image for processing of the image. If the gradation levels are supposed to be rounded down to the whole numbers, the gradation correction corrects gradation levels "1", "2", "3", "4", "5" to gradation levels "2", "4", "5", "6", "6", respectively, whereas gradation levels "0", "6", "7" remain unchanged. FIG. 23C illustrates a histogram showing the number of pixels versus gradation levels after gradation interpolation using the tone curve tc. The histogram of FIG. 23C reveals that the number of pixels having the gradation levels "1" and "3" is zero, resulting in the lack of gradation levels.

FIGS. 24A and 24B illustrate the contrast correction using a histogram. It is assumed that an input image has a 256-step gradation ranging from a gradation level "0" to a gradation level "255" and the resultant histogram for the image is shown in FIG. 24A. Such an image generally contains a large number of pixels having an intermediate gradation and, accordingly, exhibits a low contrast. Thus, the contrast correction is made to enlarge an intermediate gradation level area H shown in FIG. 24A to full scale of gradation levels. The histogram for the image after the contrast correction is shown in FIG. 24B. The histogram of FIG. 24B shows that this contrast correction also presents the lack of gradation levels.

The lack of gradation levels also occurs in other cases where the length of data indicative of the gradation levels is increased, for example, converted from 8 bits to 16 bits and where 256-color image data is displayed in full color.

The above described lack of gradation levels produces pseudo outlines in the image that is not visually satisfactory.

To overcome the above described drawback, attempts have been made to perform smoothing processing on an image using a smoothing filter or to add noise to the image, thereby making the pseudo outlines inconspicuous.

However, the smoothing processing and the noise addition processing are carried out equally on the full image in the background art methods. This causes such processing to be performed on pixels which are not to be subjected to the processing to change the gradation levels of these pixels, resulting in degradation of the quality of the image.

For example, originally sharp outlines (edges) of an image having a significant difference in gradation level are also smoothed and lose their sharpness when subjected to the smoothing processing. The addition of noise to an image roughens an originally smooth part of the image.

SUMMARY OF THE INVENTION

The present invention is intended for a method of interpolating gradation levels of an original image. According to the present invention, the method comprises the steps of: (a) serially selecting an objective pixel from the original image; and (b) interpolating original gradation levels of neighboring pixels which are present in the neighborhood of the objective pixel, to determine a corrected gradation level of the objective pixel within a limited correction range, wherein the limited correction range is defined by limit values which are nearest to the original gradation level of the objective pixel among original gradation levels existing in a gradation distribution of the original image. This prevents the reversal and omission of gradation levels to achieve the gradation level interpolation without degradation of the quality of the image.

Preferably, in the above described method, the step (a) comprises the steps of: (a-1) obtaining the gradation distribution of the original image; (a-2) detecting existent pixels having original gradation levels which exist in the original image and whose adjacent gradation levels in the gradation distribution do not exist in the original image; and (a-3) serially selecting the objective pixel among the existent pixels. This provides the suitable interpolation of the gradation levels without the degradation of the quality of the image.

Preferably, in the above described method, the step (a) comprises the step of: (a-1) serially selecting the objective pixel among at least part of the original image, and the step (b) comprises the step of: (b-1) interpolating the original gradation levels of the neighboring pixels to increase gradation density of the original image while limiting a change in gradation level of the objective pixel to a unit interval of the original gradation levels. The gradation level interpolation gives rise to no reversal of the gradation levels.

Further, a plurality of reference pixels spatially adjacent to the objective pixel are selected, with the pixels having the same gradation level as the objective pixel ignored, and the spatial interpolation is performed on the gradation levels of the plurality of reference pixels. This prevents changes in the gradation levels of pixels which are not to be processed to cause no degradation of the quality of the image. The plurality of reference pixels are extracted by searching the image from the objective pixel in predetermined positive and negative directions. This improves the efficiency of the gradation level interpolation.

The interpolation according to the present invention is performed by scanning the image. The predetermined searching directions are determined in accordance with the scanning direction. This improves the processing efficiency.

Additionally, according to the present invention, a series of pixels are specified which are in spatially successive relation to the objective pixel and have the same gradation level as the objective pixel. The image is preliminarily searched from each of the series of pixels in the predetermined positive and negative directions for a plurality of tentative reference pixels. The plurality of reference pixels for the objective pixel are selected among respective sets of tentative reference pixels obtained for the series of pixels. This improves the accuracy of the gradation level interpolation.

Then, objective pixels are serially extracted from the image. Each of the objective pixels are subjected to the spatial interpolation so that the interpolated gradation level of the objective pixel equals one of the original gradation level of the objective pixel and the original gradation levels lacking in a gradation distribution for the image. Therefore, the gradation level interpolation gives rise to no reversal of the gradation levels.

Furthermore, according to the present invention, a spatial filter having a variable smoothing distance constant is defined. Sections of the image are scanned and smoothed using the spatial filter while the smoothing distance constant is changed in accordance with the spatial change rate of gradation levels in the respective image sections. This allows sufficient smoothing of a section with gentle gradation changes, and smoothing of an edge section without losing its sharpness.

It is therefore an object of the present invention to provide a method of and apparatus for interpolating gradation levels of an image without degradation of the quality of the image.

These and other objects, features, aspects and advantages of the present invention will become more apparent from the following detailed description of the present invention when taken in conjunction with the accompanying drawings.

DESCRIPTION OF THE PREFERRED EMBODIMENTS

1. Principles of the Invention

The principles of the present invention will now be described.

a) First Feature

Figure 1:
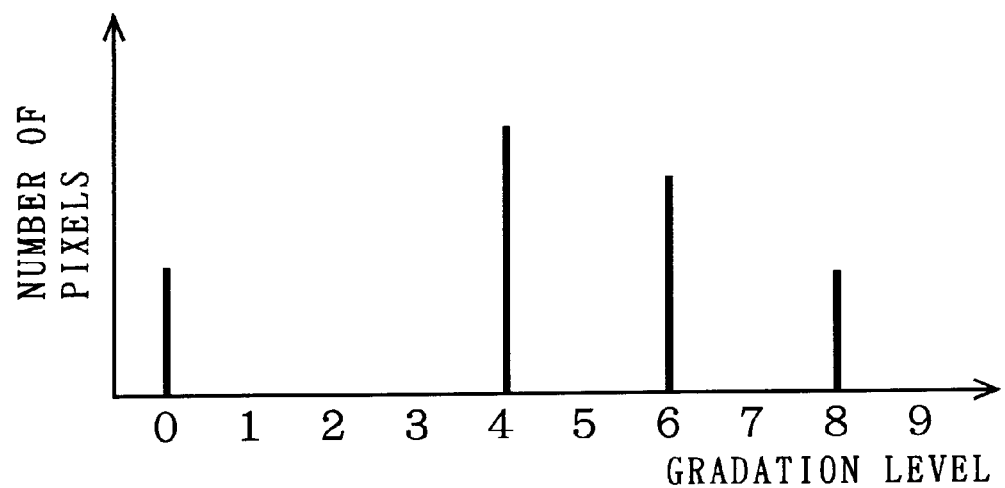
FIG. 1 shows a histogram illustrating the principles of the present invention.

An image comprising no pixels that have some particular gradation levels is contemplated. For example, when attention is given to gradation levels ranging from "0" to "9", the image comprises pixels having gradation levels "0", "4", "6", and "8" but comprises no pixels having gradation levels "1", "2", "3", "5", "7", and "9". A histogram showing a gradation level distribution for the image is illustrated in FIG. 1.

Figure 2A:
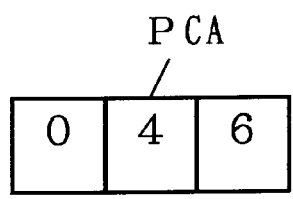
FIGS. 2A and 2B illustrate the principles of the present invention.
Figure 3A:
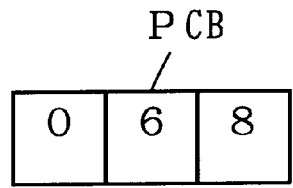
FIGS. 3A and 3B illustrate the principles of the present invention.

The image is supposed to include a section containing an array of spatially contiguous pixels having the gradation levels "0", "4", and "6" as shown in FIG. 2A and a section containing an array of spatially contiguous pixels having the gradation levels "0", "6", and "8" as shown in FIG. 3A.

The gradation levels of respective middle pixels $P_{CA}$ and $P_{CB}$ in the sections are interpolated using the gradation levels of the pixels located on opposite sides of the middle pixels by the background art technique. Then, the gradation level of the middle pixel $P_{CA}$ of FIG. 2A is corrected to (0+6)/2=3 as shown in FIG. 2B, and the gradation level of the middle pixel $P_{CB}$ of FIG. 3A is corrected to (0+8)/2=4 as show in FIG. 3B.

Figure 2B:
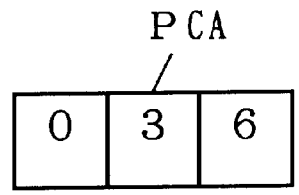
Figure 3B:
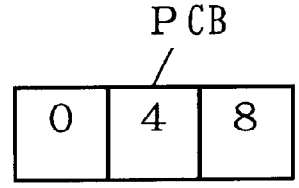

The image section of FIG. 2B exhibits spatial gradation level changes from "0" to "3" and then to "6" which provide an acceptable result since the image is smoothed. The image section of FIG. 3B, on the other hand, exhibits spatial gradation level changes from "0" to "4" and then to "8" which provide fuzzy edges by the background art technique although the original image section of FIG. 3A exhibits a significant gradation level change from "0" to "6" which is to be maintained since this section corresponds to edges and the like.

To prevent this background art problem, the spatial interpolation of the gradation level of the pixel $P_{CB}$ should be under such restrictions that the interpolated gradation level of an objective pixel which is to be subjected to the gradation level interpolation (the pixel $P_{CB}$ in FIG. 3A) falls within a gradation level range between the low and high gradation levels ("4" and "8") of the pixels present in the image which are closest to the original gradation level (="6") of the objective pixel $P_{CB}$ on the basis of the gradation level distribution (FIG. 1) for the image, that is, it is at least not less than "4" and not greater than "8". Specifically, the interpolated gradation level of the pixel $P_{CB}$ of FIG. 3A should be at least within the range of from "4" to "8".

The gradation levels "5" to "7", for example, are selected as an allowable range of correction gradation levels of the pixel $P_{CB}$. When the gradation level interpolation for the pixel $P_{CB}$ provides the interpolated gradation level (7−5)× ½+5=6 to the pixel $P_{CB}$ in consideration for the spatial position of the pixel $P_{CB}$ as will be described in detail later. The gradation level of the pixel $P_{CB}$ remains unchanged before and after the gradation level interpolation. Then, the array of pixels in the image section of FIG. 3A have the gradation levels "0", "6", and "8" after the gradation level interpolation for the pixel $P_{CB}$ to represent the edges of the original image which are not fuzzy.

The application of the principle to the full image exerts no adverse influences on the image section shown in FIG. 2A. In the application of the principle to the full image including the section of FIG. 2A, the interpolation in consideration for the spatial position of the objective pixel should be performed under such restrictions that the interpolated gradation level of the objective pixel (the pixel $P_{CA}$) falls within a gradation level range between the low and high gradation levels ("0" and "6") of the pixels present in the image which are adjacent to the original gradation level (="4") of the objective pixel $P_{CA}$ on the basis of the gradation level distribution (FIG. 1) for the image. That is, the minimum conditions to be satisfied are such that the interpolated gradation level of the objective pixel is not less than "0" and not greater than "6".

In this case, the interpolated gradation level $(5-1) \times \frac{1}{2} + 1 = 3$ is provided by the interpolation method to be described later in detail without impairing the smoothing effect in this section.

The first feature of the present invention is the spatial interpolation of the gradation levels of objective pixels of an image in accordance with the above described principle (referred to hereinafter as a "first principle") under such restrictions that the interpolated gradation level of each objective pixel falls within a gradation level range between the low and high gradation levels of the pixels present in the image which are the closest to the original gradation level of the objective pixel on the basis of the gradation level distribution for the image.

b) Second Feature

The first principle may be contemplated from another viewpoint. The interpolated gradation level of the objective pixel shown in FIG. 3B obtained from the original gradation levels of FIG. 3A by the background art technique results from the neglect of the fact that a pixel having the gradation level "4" is present at a position in the original image.

More specifically, the gradation level "4" is not given to the pixel $P_{CB}$ although the selection of the gradation level "4" for the pixel $P_{CB}$ creates no problem in the original image. This means that no assignment of the gradation level "4" to the pixel $P_{CB}$ is more faithful to the original image. Forcing the gradation level of the pixel $P_{CB}$ to be "4" by the interpolation regardless of the above described circumstances results in rather adverse influences in terms of reproducibility of the image.

Therefore, a solution to the problem encountered by the background art technique is the spatial interpolation of the gradation levels of the objective pixels included in the image under such restrictions that the interpolated gradation level of each objective pixel equals one of the following:

i) a gradation level which is lacking in the gradation level distribution for the image prior to the interpolation, and ii) the original gradation level of the objective pixel itself prior to the interpolation.

The second feature of the present invention is based on the above described principle (referred to hereinafter as a "second principle") which may be specifically explained also with reference to FIGS. 1, 2A, 2B, 3A and 3B. The second principle also allows the gradation level interpolation for the image without making fuzzy edges.

c) Third Feature

The present invention may be discussed from still another viewpoint.

The gradation level interpolation for an image is conceptually analogous to implementing an image filter having a smoothing function upon the image.

Figure 4A:
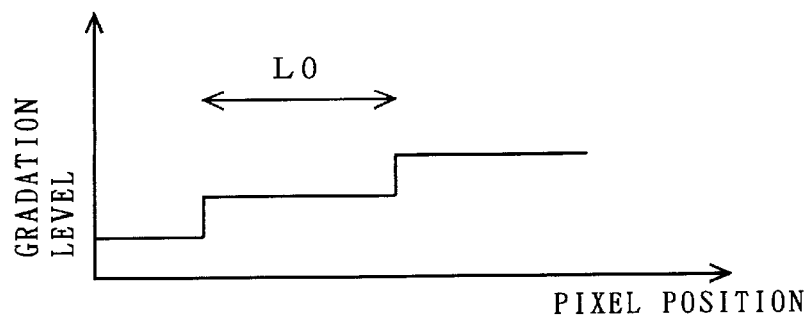
FIGS. 4A and 4B illustrate the principles of the present invention.
Figure 4B:
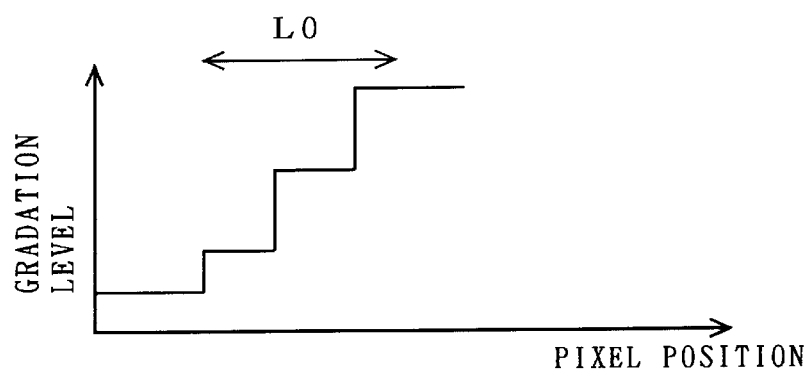

Two arrays of pixels shown in FIGS. 4A and 4B are supposed from the viewpoint of an "image filter". The graph of FIG. 4A shows gentle changes from one gradation level of contiguous pixels to another gradation level, and the graph of FIG. 4B shows abrupt changes in gradation level at relatively short intervals.

Figure 5A:
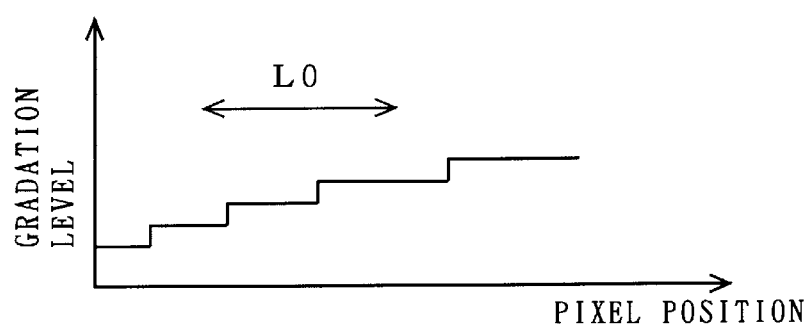
FIGS. 5A and 5B illustrate the principles of the present invention.
Figure 5B:
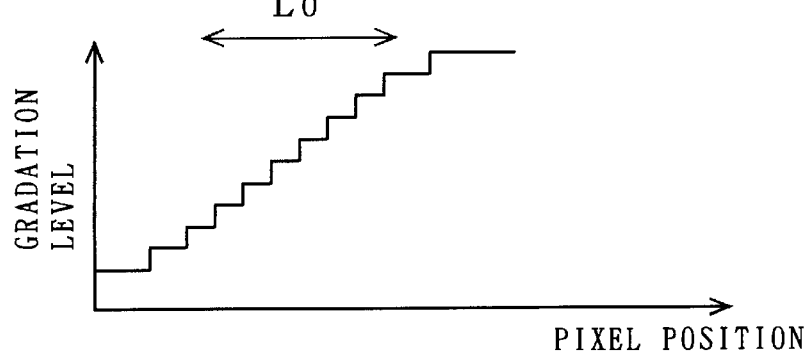

The background art image filter having a smoothing distance constant L0 is supposed to be implemented upon the two arrays of pixels. Both of the arrays of pixels shown in FIGS. 4A and 4B to which the fixed smoothing distance constant L0 is applied are equally smoothed as illustrated in FIGS. 5A and 5B. The array of pixels of FIG. 4B corresponding to an edge of the image is significantly smoothed to result in a fuzzy edge of the image.

The solution to this problem lies in varying the smoothing distance constant in accordance with a spatial change rate of the original gradation levels adjacent an objective pixel, rather than using the fixed smoothing distance constant.

Figure 6A:
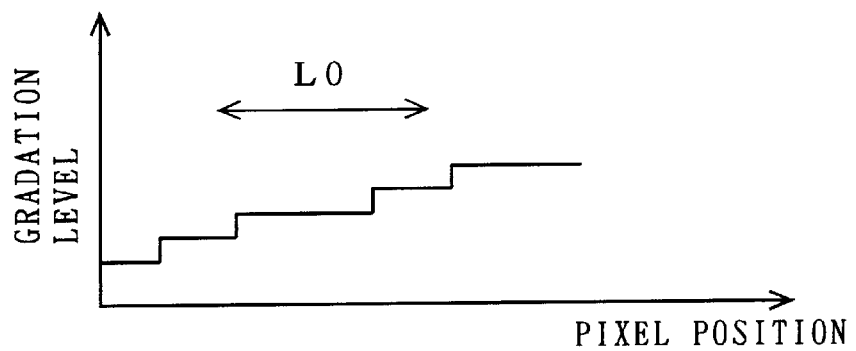
FIGS. 6A and 6B illustrate the principles of the present invention.
Figure 6B:
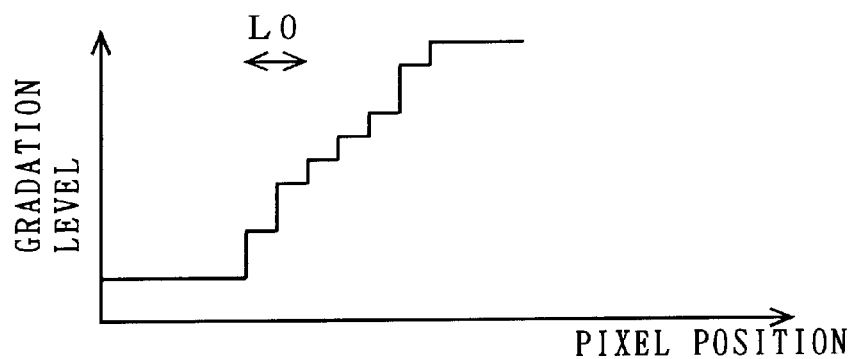

For instance, the smoothing distance constant L0 is increased adjacent a section of the image shown in FIG. 4A having a low spatial change rate of gradation levels, whereas the smoothing distance constant L0 is decreased adjacent a section of image shown in FIG. 4B having a high spatial change rate of gradation levels. This allows sufficient smoothing in the image section shown in FIG. 4A which indicates the gentle changes in gradation level as illustrated in FIG. 6A, and smoothing within a limited area in the image section shown in FIG. 4B which indicates the abrupt changes in gradation level as illustrated in FIG. 6B, with the sharp edge maintained.

The image filter which is the third feature of the present invention conforms to the above described principle. The spatial filter having a variable smoothing distance constant is defined to vary the smoothing distance constant in accordance with the spatial change rate of gradation levels in respective sections of the image and to scan and smooth the sections of the image using the spatial filter.

A preferred embodiment of the present invention to be described below employs the interpolation techniques of the first and second features and the technique of the image filter of the third feature.

Specifically, the concept of the image filter of the third feature is used to determine a spatial range of pixels to be subjected to the interpolation, and the concepts of the first and second features of the invention are used to determine restrictions to be imposed on the interpolated gradation levels of the objective pixels.

2. Structure of Apparatus

Figure 7:
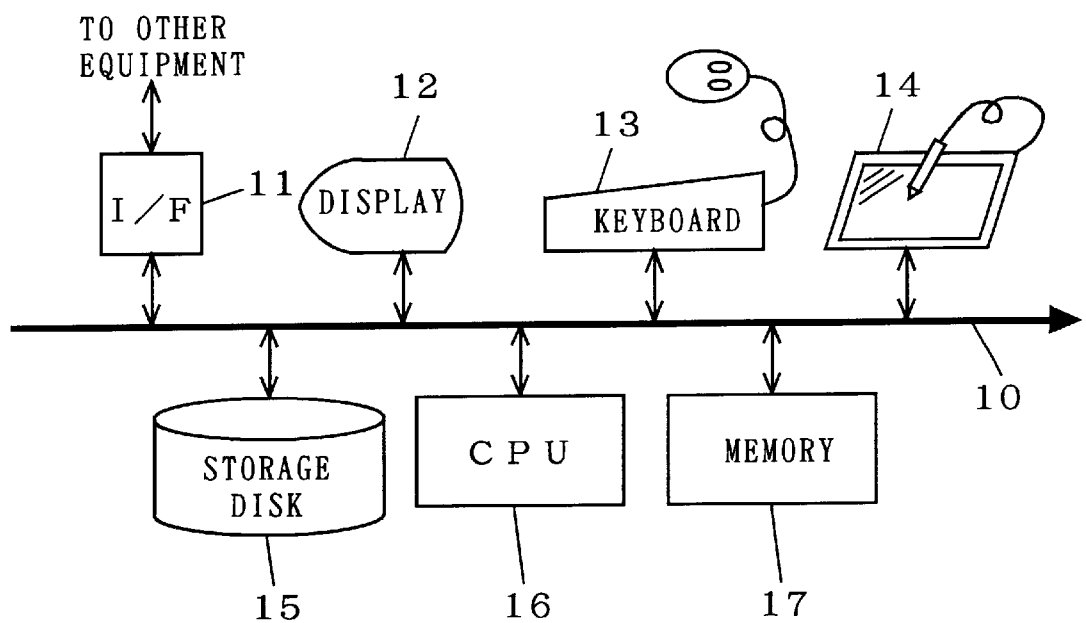
FIG. 7 is a diagram of an apparatus according to a preferred embodiment of the present invention.

FIG. 7 is a diagram of an apparatus for interpolating gradation levels of an image according to a preferred embodiment of the present invention. The apparatus of the preferred embodiment comprises a data bus 10 for transmitting various signals as depicted in FIG. 7 and connected to an interface 11, a display 12, a keyboard 13, an input unit 14, a storage disk 15, a CPU 16, a memory 17, and the like. The interface 11 serves as a connecting portion for connecting the apparatus to other equipment. The apparatus transmits and receives data via the interface 11 to and from equipment such as other computers, an image input unit, and a printer. The display 12 displays image signals transmitted from the CPU 16. The keyboard 13 serves as a manipulation input unit from which an operator enters data, and includes a mouse. The input unit 14 is a pen input unit other than the keyboard and mouse. The storage disk 15 and the memory 17 are storage units for storing and holding data therein. The CPU 16 is a processing unit for executing various processes.

The image to be subjected to the gradation level interpolation is entered through the interface 11 or provided by the CPU 16 reading the image data previously stored in the storage disk 15.

3. Overview of Gradual Level Interpolation

In this preferred embodiment, a lacking gradation level in the image to be subjected to the gradation level interpolation is initially determined by producing a histogram for the image. For increase in data length indicative of gradation levels, the lacking gradation level may be derived only from calculation without producing the histogram. For example, when the data length indicative of gradation levels is increased from 8 bits to 16 bits, gradation levels "0, 1, 2, . . . " are converted to gradation levels "0, 256, 512, . . . ", and the gradation levels ranging from "1" to "255", and from "257" to "511" are lacking. The range of the lacking gradation levels is referred to as a "unit change range".

Figure 23A:
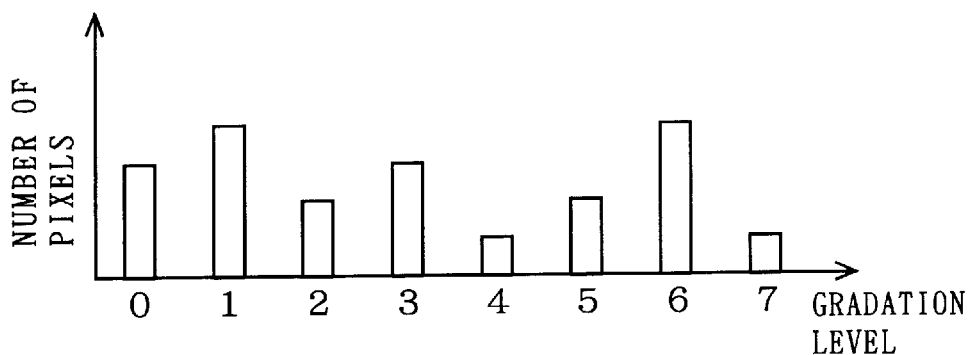
FIGS. 23A through 23C show gradation correction using a tone curve.
Figure 23B:
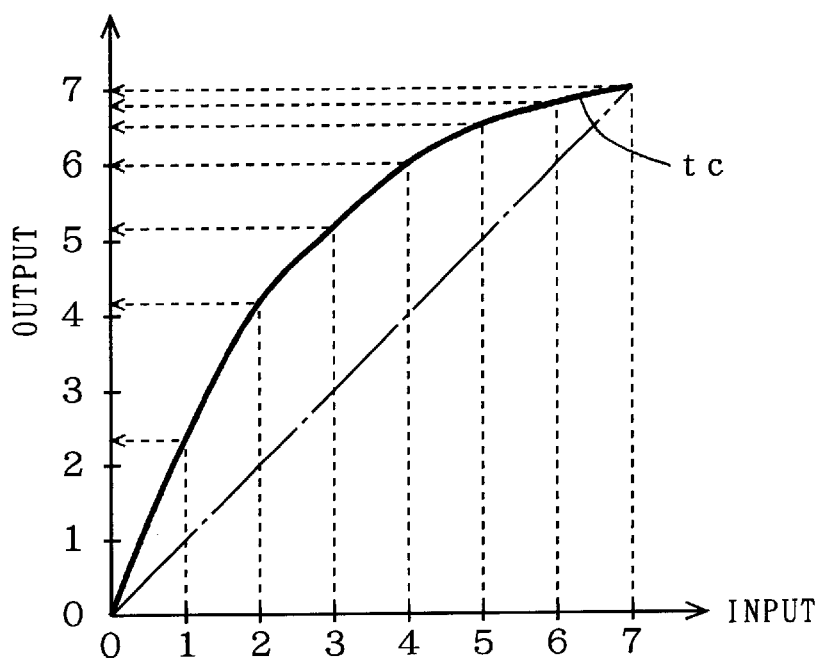
Figure 23C:
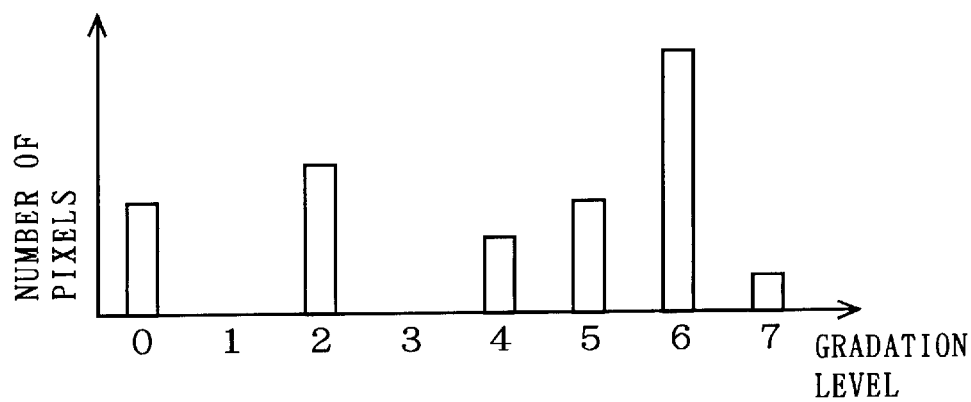
Figure 24A:
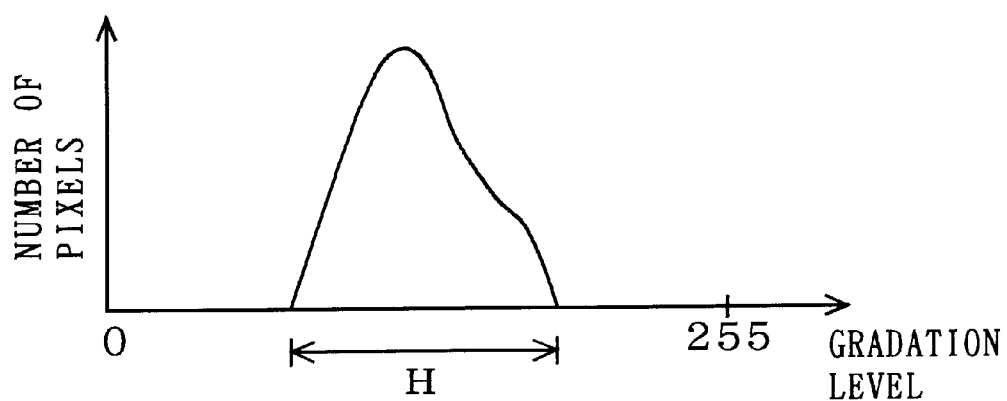
FIGS. 24A and 24B show contrast correction using a histogram.
Figure 24B:
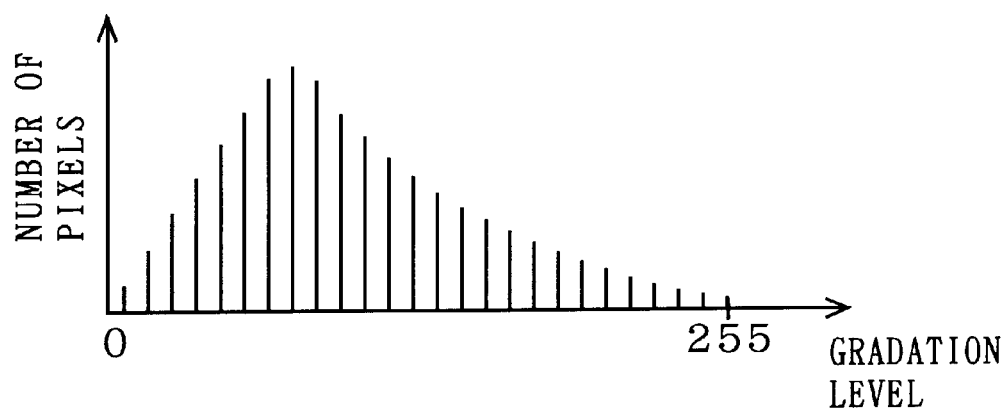

When a histogram is produced, a gradation level shown in the histogram as associated with the number of pixels which is equal to zero or is not greater than a predetermined number is determined as the lacking gradation level. In the histogram of FIG. 23C, for example, the gradation levels "1" and "3" associated with the number of pixels which equals zero are determined as the lacking gradation levels. Alternatively, a given gradation level may be determined as the gradation level that is not lacking if the number of pixels having the given gradation level is not less than the threshold number of pixels previously set, and determined as the lacking gradation level if the number of pixels having the given gradation level is less than the threshold number of pixels.

Figure 8:
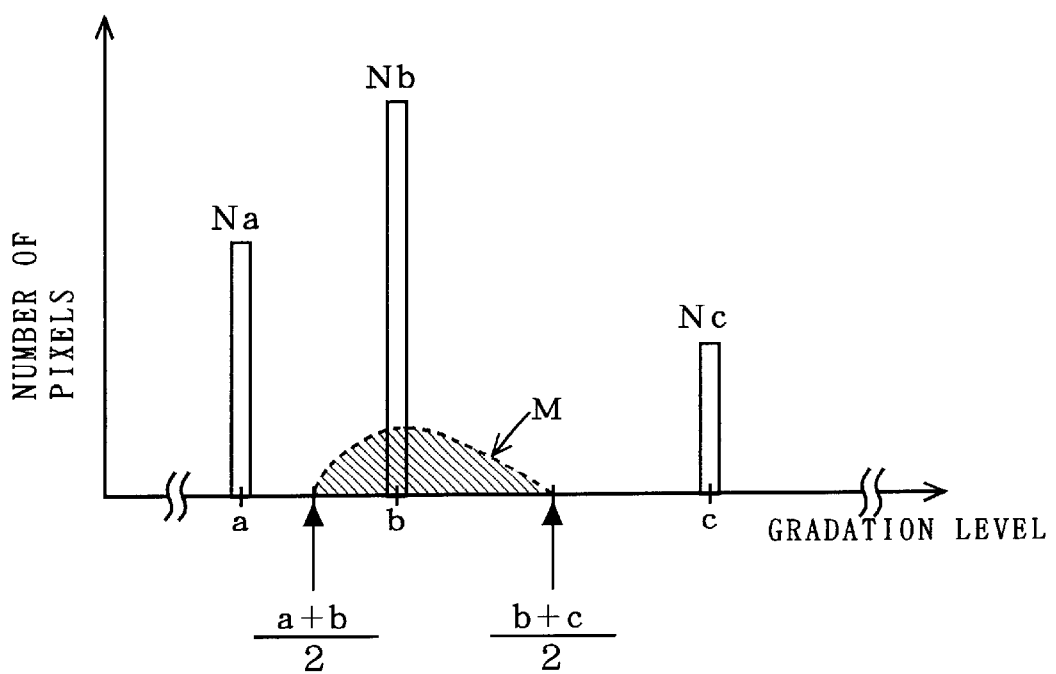
FIG. 8 partially shows a histogram illustrating gradation level interpolation according to the preferred embodiment.

FIG. 8 shows a partial histogram for illustrating the gradation level interpolation of this preferred embodiment. In the histogram of FIG. 8, a, b, and c represent gradation levels which are not contiguous to each other. Na pixels have the gradation level a; Nb pixels have the gradation level b; and Nc pixels have the gradation level c. No pixels have other gradation levels. Thus, the lack of gradation levels exists between the levels a and b and between the levels b and c. In this case, the gradation levels a, b, and c are those to be interpolated, and the pixels having the gradation levels a, b, and c are the objective pixels.

The gradation level associated with the number of pixels which is very small may be regarded as the lacking gradation level in consideration for noises.

The gradation level b is discussed below. For interpolation of the lacking gradation levels between the gradation levels a and b and between the gradation levels b and c, the gradation level b of the objective pixels is corrected to form a distribution as indicated by the shaded area M. Since the original number of pixels having the gradation level b is Nb, the shaded area M also include Nb pixels. The range of correction levels of the gradation level b of FIG. 8 has a lower limit that is a median level (a+b)/2 between the gradation levels a and b, and an upper limit that is a median level (b+c)/2 between the gradation levels b and c. The interpolated gradation level of a given objective pixel is sometimes equal to the original gradation level thereof prior to the interpolation.

Similar interpolation is performed on the gradation level a of Na pixels and the gradation level c of Nc pixels. The range of correction levels of the gradation level a has an upper limit (a+b)/2, and the range of correction levels of the gradation level c has a lower limit (b+c)/2. This gives rise to neither reversal nor omission of gradation levels. The reversal of gradation levels means that the corrected gradation level of an objective pixel exceeds the corrected gradation level of another objective pixel when the original gradation level of the latter objective pixel is higher than the original gradation level of the former objective pixel. The correction levels of the gradation level of the objective pixel may be set within any range which causes no reversal of gradation levels. The upper and lower limits of the range of correction levels of the gradation level b to be interpolated are not limited to the median level between the level b and the higher adjacent non-lacking level c and the median level between the level b and the lower adjacent non-lacking level a, respectively, as illustrated in FIG. 8. For example, the upper and lower limits may be the gradation levels b and a, respectively, or may be the gradation levels c and b, respectively. Otherwise, the upper and lower limits may be any gradation level that falls within the range from the level a to the level c.

The objective pixels having the gradation levels to be interpolated and the range of correction levels of the gradation level of each of the objective pixels are determined in this manner based on the histogram for the image to be subjected to the gradation level interpolation.

Next, the gradation level interpolation within an image plane is described hereinafter. The pixels of the image to be subjected to the gradation level interpolation are sequentially examined one by one to extract objective pixels. Then, all of the objective pixels are processed as will be described below. In the following description, a pixel having a gradation level higher than that of the objective pixel is referred to as a high-level pixel, and a pixel having a gradation level lower than that of the objective pixel is referred to as a low-level pixel.

First, the image is scanned for each pixel to detect an objective pixel. Then, the range of correction levels of the gradation level of the detected objective pixel is determined to provide upper and lower limits $L_{high}$ and $L_{low}$ thereof. The high-level pixel and low-level pixel positioned closest to the objective pixel within the image plane are detected. A high-level distance $D_{high}$ between the objective pixel and the detected high-level pixel, and a low-level distance $D_{low}$ between the objective pixel and the detected low-level pixel are determined. The gradation level interpolation is performed by $$L = (L_{high} - L_{low}) \times \frac{D_{low}}{D_{low} + D_{high}} + L_{low} \quad (1)$$

where L is the corrected gradation level of the objective pixel. Equation (1) shows linear interpolation. However, non-linear interpolation is permitted using a function f(D) of distances.

$$L = (L_{high} - L_{low}) \times \frac{f(D_{low})}{f(D_{low}) + f(D_{high})} + L_{low} \quad (2)$$

Figure 9:
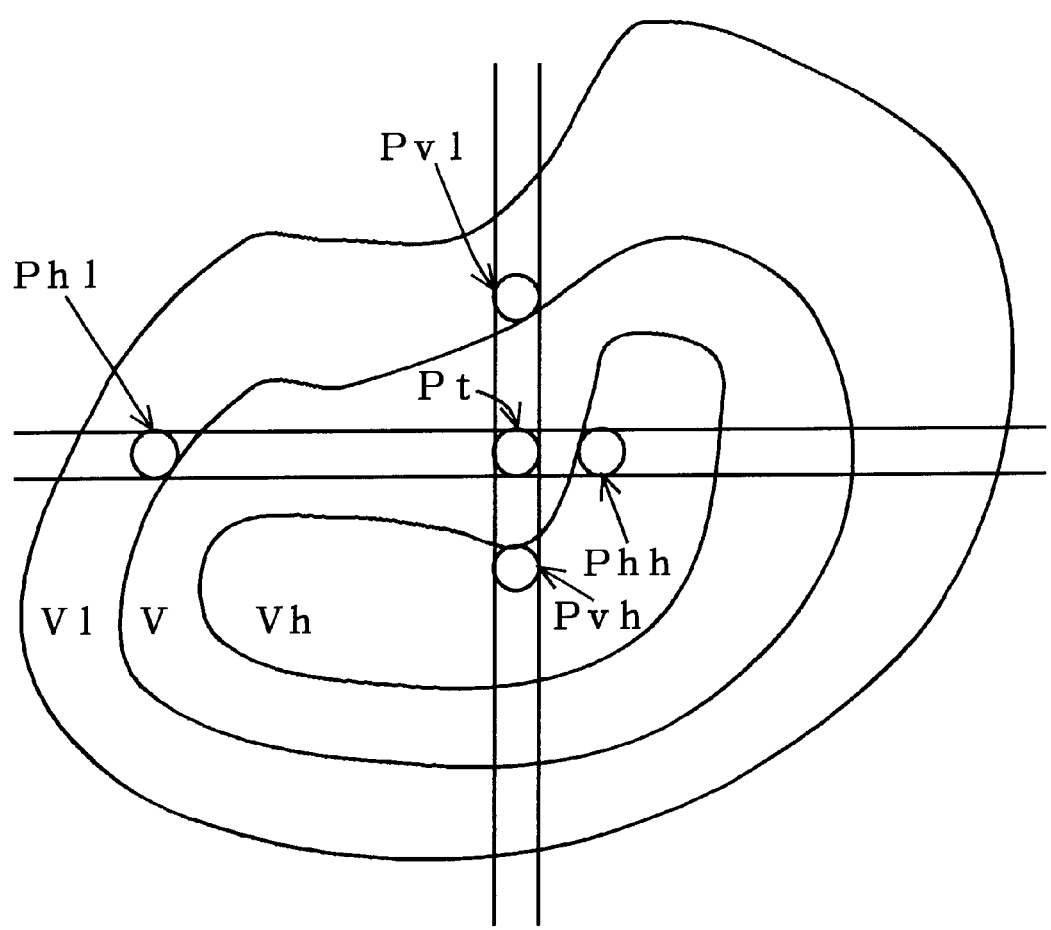
FIG. 9 is a plan view of an image for illustrating the gradation level interpolation according to the preferred embodiment.

FIG. 9 is a plan view of an image for illustrating the gradation level interpolation according to this preferred embodiment. Gradation levels Vl, V, Vh satisfy the relationship Vl<V<Vh, and contour lines of the gradation levels Vl, V, Vh are shown in FIG. 9. The gradation level V is supposed to be a gradation level to be interpolated, and attention is given to a pixel Pt, for example. The pixel Pt which has the gradation level V is an objective pixel. For detection of the high-level and low-level pixels positioned closest to the objective pixel Pt, it is desirable to calculate the distances from the objective pixel Pt to all of the pixels constituting the image. This calculation, if performed in practice, requires a substantial amount of time to decrease the processing efficiency. However, an approximate detection technique is employed for an image including a few sections with relatively even gradation, such as an image of natural objects, wherein the high-level and low-level pixels are considered to be positioned adjacent the objective pixel.

Referring to FIG. 9, the image is searched in the vertical direction from the objective pixel Pt for a high-level pixel Pvh positioned closest to the objective pixel Pt, and then searched in the horizontal direction from the objective pixel Pt for a high-level pixel Phh positioned closest to the objective pixel Pt. A comparison is made between the high-level pixels Pvh and Phh to determine the high-level distance $D_{high}$ between the objective pixel Pt and one of the high-level pixels Pvh and Phh which is closer to the objective pixel Pt.

Similarly, the image is searched in the vertical and horizontal directions for low-level pixels Pvl and Phl, respectively. A comparison is made between the low-level pixels Pvl and Phl to determine the low-level distance $D_{low}$ between the objective pixel Pt and one of the low-level pixels Pvl and Pvh which is closer to the objective pixel Pt.

After the high-level distance $D_{high}$ and the low-level distance $D_{low}$ are provided in this manner, the corrected gradation level L of the objective pixel is calculated by Equation (1).

In this preferred embodiment, as above described, the method of interpolation comprises: detecting the objective pixel having the gradation level to be interpolated to determine the range of correction levels of the gradation level of the objective pixel; detecting the high-level pixels having the gradation levels higher than that of the objective pixel, and the low-level pixels having the gradation levels lower than that of the objective pixel; detecting one of the high-level pixels which is positioned closest to the objective pixel within the image plane to derive the distance between the detected high-level pixel and the objective pixel; detecting one of the low-level pixels which is positioned closest to the objective pixel within the image plane to derive the distance between the detected low-level pixel and the objective pixel; and interpolating the gradation level of the objective pixel which is within the previously determined range in accordance with the distance between the high-level pixel and the objective pixel and the distance between the low-level pixel and the objective pixel.

The above method fails to detect the closest pixel to the objective pixel when the closest pixel is positioned obliquely relative to the objective pixel. However, in the case of an image wherein the pixel to be detected is assumed to be positioned adjacent the objective pixel, such as an image of natural objects, this method merely generates some errors of the detected distances and exerts a slight influence on the corrected gradation level.

The method of interpolation of the present invention described below as an example is intended to further improve the accuracy.

4. Example

Figure 10:
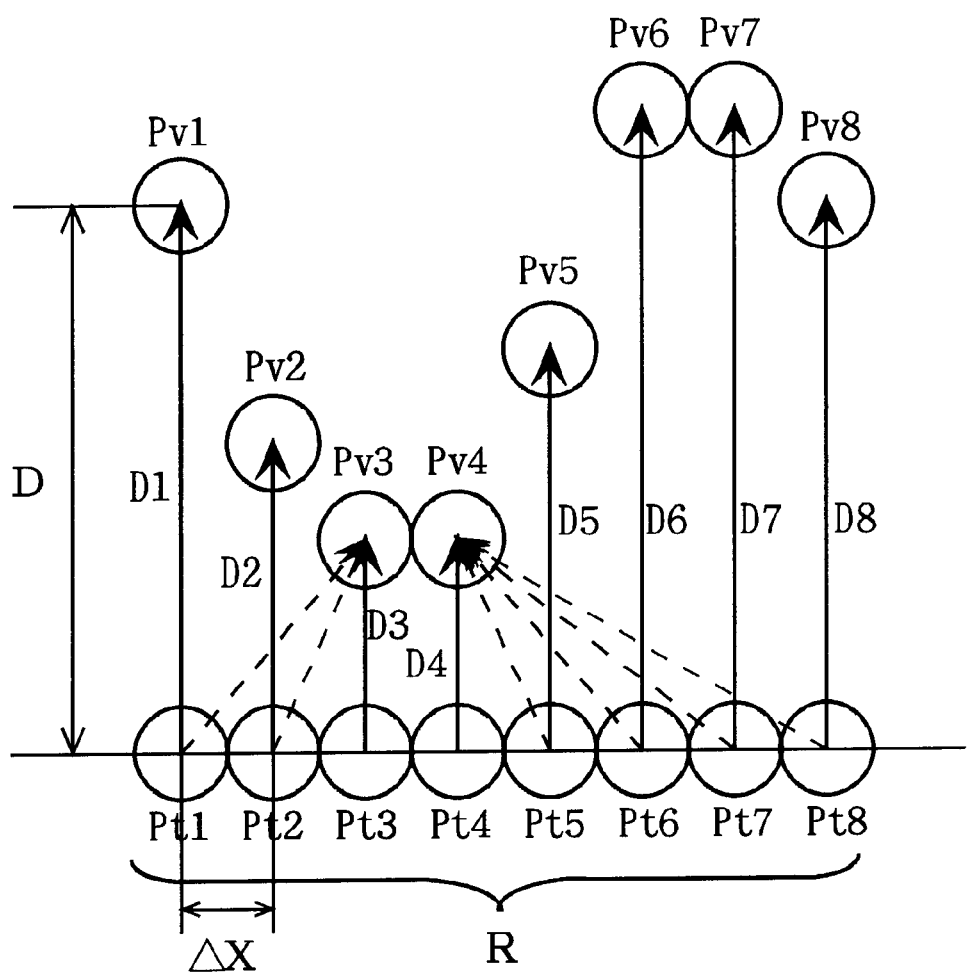
FIG. 10 illustrates an example according to the present invention.

FIG. 10 illustrates an example of the present invention. As shown in FIG. 10, an array of horizontally contiguous pixels having the same gradation level are detected from a multiplicity of objective pixels in the image to be subjected to the gradation level interpolation. The detected array R of contiguous objective pixels Pt1 to Pt8 having the same gradation level is referred to as a "run". For each objective pixel included in the run, the image is searched in the vertical direction therefrom for the high-level pixel and the low-level pixel. Since similar operations are performed for the high-level and low-level pixels, only the operation for the high-level pixels is described below. High-level pixels Pv1 to Pv8 for the objective pixels Pt1 to Pt8 constituting the run R are extracted as illustrated in FIG. 10. Then, distances from the objective pixel Pt1 to all of the high-level pixels Pv1 to Pv8 are calculated. Calculation of the distance between the objective pixel Pt1 and the high-level pixel Pv3, for example, is described below. A distance D3 between the objective pixel Pt3 and the high-level pixel Pv3 has been determined during the previous vertical search. A pixel-to-pixel distance Δx has been known. Thus, the distance Dh between the objective pixel Pt and the high-level pixel Pv3 is $$Dh=\sqrt{(D3)^2+(2\times\Delta x)^2} \quad (3)$$

Similarly, the distances from each of the objective pixels Pt1 to Pt8 constituting the run R to all of the extracted high-level pixels Pv1 to Pv8 are calculated. Then, the high-level pixel at the shortest distance from each of the objective pixels Pt1 to Pt8 is extracted. The example shown in FIG. 10 reveals that the high-level pixel Pv3 is positioned at the shortest distance from the objective pixels Pt1 to Pt3 and the high-level pixel Pv4 is positioned at the shortest distance from the objective pixels Pt4 to Pt8.

Such processing is carried out on a run of horizontally contiguous objective pixels of the image and on a run of vertically contiguous objective pixels of the image.

Similar processing is performed for extraction of the low-level pixels. The low-level pixels positioned at the shortest distance from the objective pixels Pt1 to Pt8 are extracted. After the extraction of the high-level and low-level pixels positioned at the shortest distance from the objective pixels, the gradation levels of the objective pixels are corrected using Equation (1).

Figure 11A:
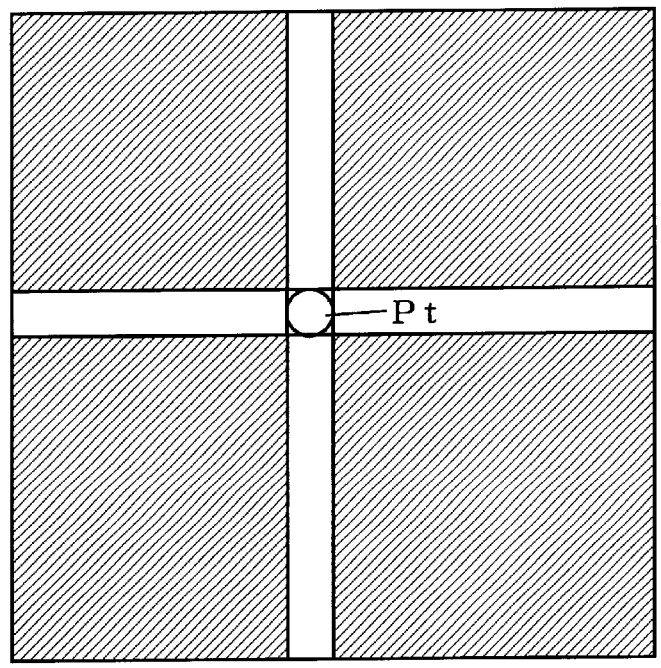
FIGS. 11A and 11B are plan views of an image showing search areas for high-level and low-level pixels.
Figure 11B:
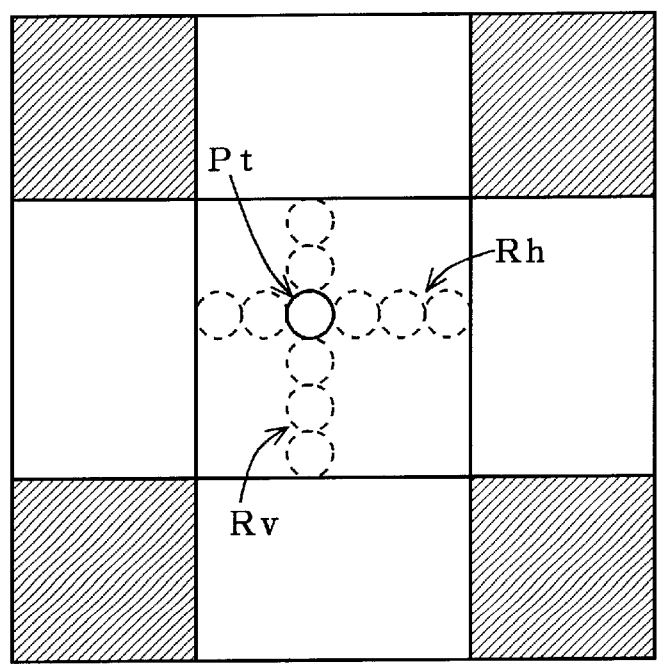

The example of the present invention extracts of the high-level and low-level pixels for runs of objective pixels distributed contiguously in the horizontal and vertical directions, improving the accuracy of interpolation. The search for the high-level and low-level pixels for each objective pixel presents areas which are not to be searched as indicated by the shaded parts of FIG. 11A during the search based on the objective pixel Pt, failing to detect the closest high-level and low-level pixels positioned obliquely relative to the objective pixel. The search for the high-level and low-level pixels based on horizontal and vertical runs Rh an Rv as shown in FIG. 11B reduces the shaded areas which are not to be searched based on the objective pixel Pt. This allows the detection of some of the high-level and low-level pixels positioned obliquely adjacent the objective pixel Pt, improving the interpolation accuracy. The situation shown in FIG. 11A may be regarded as that wherein the number of objective pixels constituting the horizontal and vertical runs equals "1". In this case, there are no pixels positioned adjacent the objective pixel Pt and having the same gradation level, and the high-level and low-level pixels are positioned adjacent the objective pixel Pt. Therefore, the extraction of the high-level and low-level pixels based on the run according to the example of the present invention allows the large area to be searched in a relatively even image with a relatively small gradation change, and the small area to be searched in a relatively uneven image with a relatively large gradation change. The area to be searched is automatically changed depending upon the images to be subjected to the interpolation.

5. Processing Sequence

Description will be given on the processing sequence of the practical gradation level interpolation using the structure of FIG. 7. FIGS. 12 through 17 are flowcharts showing the processing sequence of the image gradation level interpolation according to the example of the present invention. The processing is executed by the CPU 16 of FIG. 7.

Figure 12:
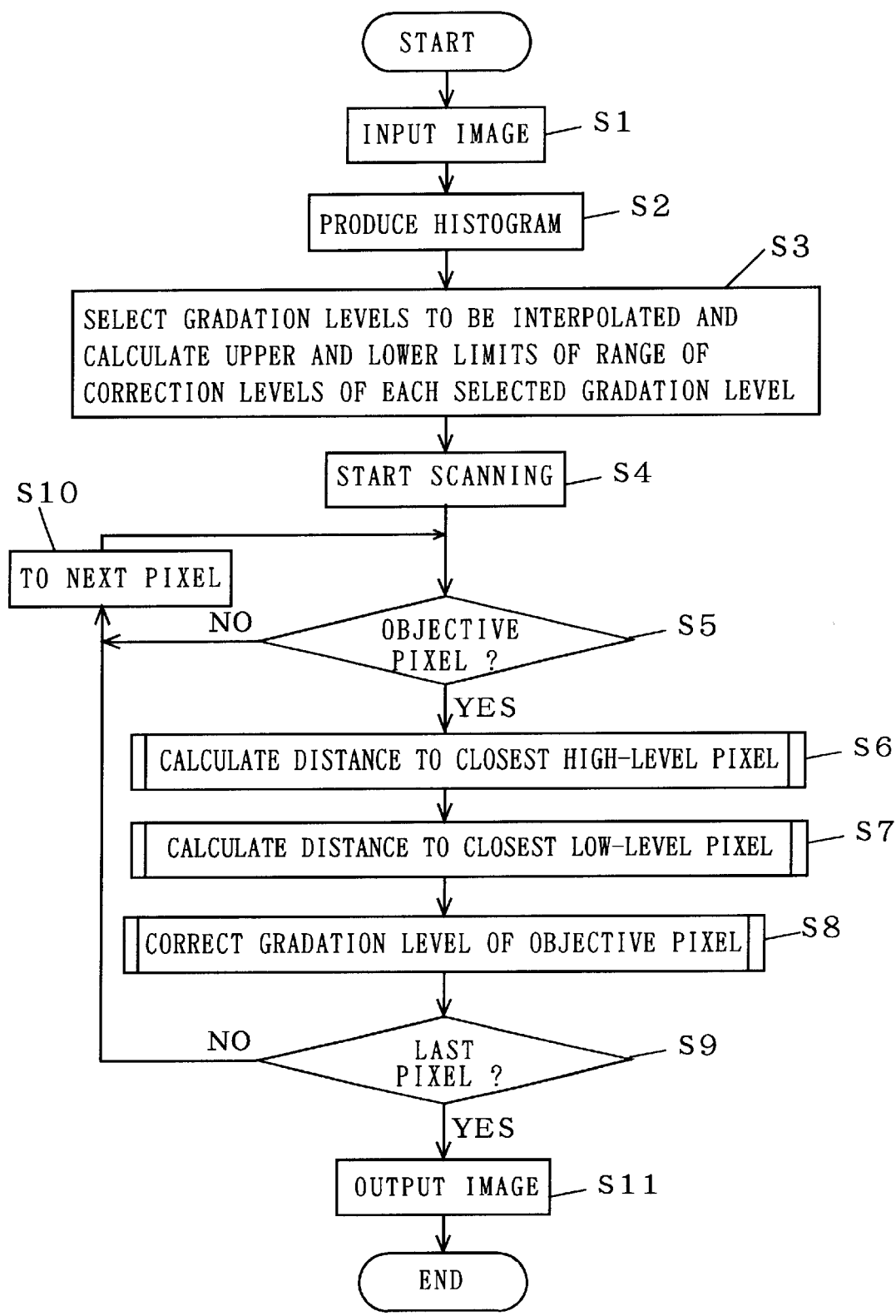
FIGS. 12 through 17 are flowcharts showing the processing sequence of the gradation level interpolation for an image according to the example of the present invention.

Initially, in the step S1 of FIG. 12, an image to be subjected to the gradation level interpolation is inputted to the apparatus and held in the memory 17 (FIG. 7). The CPU 16 analyzes the input image stored and held in the memory 17 to produce a histogram (step S2).

Figure 18:
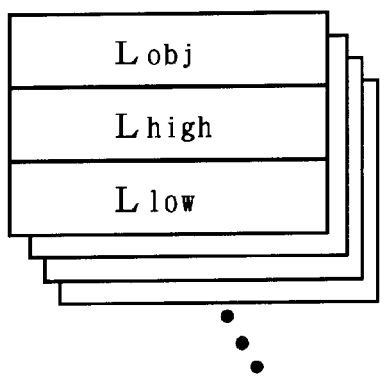
FIG. 18 conceptually shows a structure of objective buffers.

In the step S3, a gradation level to be interpolated is selected from the produced histogram. The gradation level to be interpolated in the step S3 is the gradation level associated with the number of pixels which is equal to zero or not greater than a predetermined number. The selected gradation level to be interpolated is written into an objective buffer in the memory 17. FIG. 18 conceptually shows the structure of objective buffers. The selected gradation level $L_{obj}$ is written in the position shown in FIG. 18. In practice, a plurality of gradation levels $L_{obj}$ to be interpolated can be selected by analyzing the histogram, and are all written into the objective buffers, respectively. The upper limits $L_{high}$ and lower limits $L_{low}$ of the ranges of correction levels of the respective gradation levels are calculated and stored in the objective buffers. Thus, each of the objective buffers stores the gradation level $L_{obj}$, and the upper and lower limits $L_{high}$ and $L_{low}$ used for correction of the gradation level $L_{obj}$ as shown in FIG. 18. After the upper limits $L_{high}$ and lower limits $L_{low}$ for all of the gradation levels $L_{obj}$ selected from the histogram are calculated and written into the objective buffers, the flow proceeds to the next process.

Figure 19:
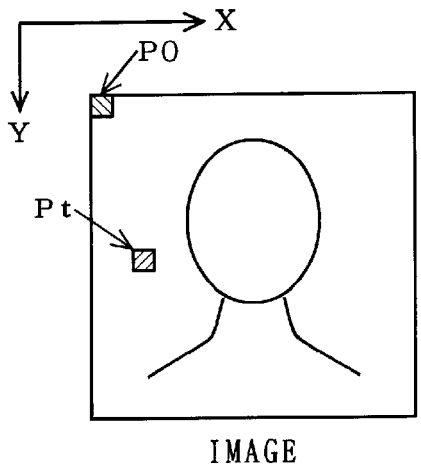
FIG. 19 shows an input image stored in a memory.

In the step S4, scanning starts to detect the gradation level of each of the pixels in the input image. FIG. 19 shows an exemplary input image stored in the memory 17. The image is scanned for each pixel, with the X and Y directions shown in FIG. 19 used as the main scanning and sub-scanning directions, respectively. The scanning starts from a pixel P0 shown in FIG. 19 as a pixel of interest.

In the step S5, whether or not the pixel of interest is the objective pixel is judged. The judgment is made by comparing the gradation level of the pixel of interest with all of the gradation levels $L_{obj}$ stored in the objective buffers (FIG. 18) of the memory 17 to determine if there is a match. If the gradation level of the pixel of interest matches any one of the gradation levels $L_{obj}$, the pixel of interest is the objective pixel, and the result of judgment is "YES". If the gradation level of the pixel of interest matches no one of the gradation levels $L_{obj}$, the pixel of interest is not the objective pixel, and the result of judgment is "NO".

Figure 13:
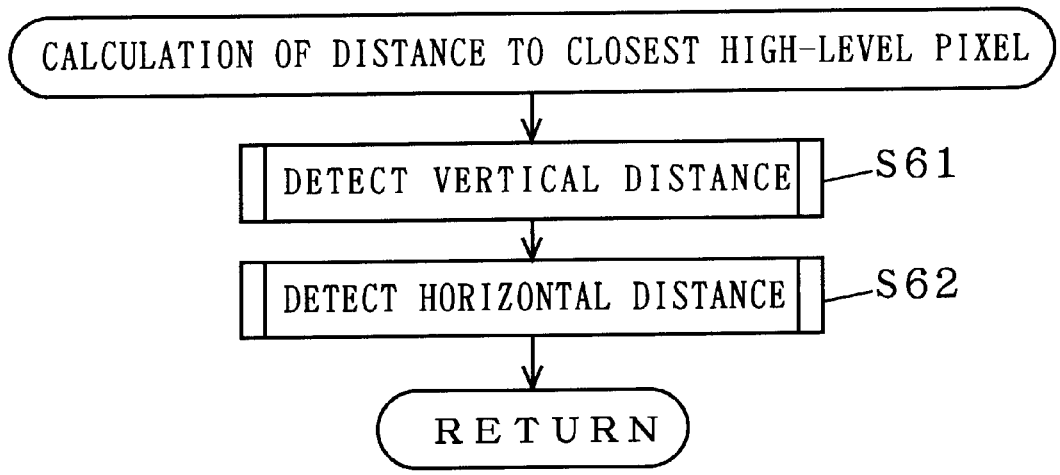
Figure 20A:
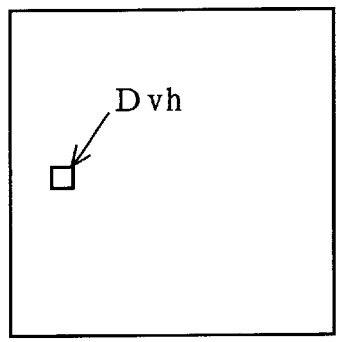
FIGS. 20A through 20D show various distance buffers for use in the preferred embodiment of the present invention.
Figure 20B:
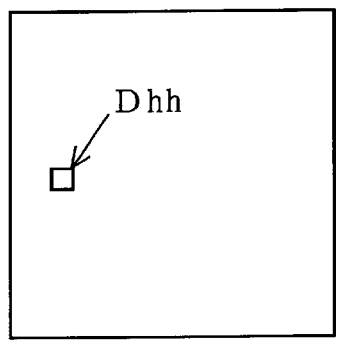

If the pixel of interest is the objective pixel, the distance from the pixel of interest to the closest high-level pixel is calculated in the step S6. The step S6 includes the detection of a vertical distance (step S61) and the detection of a horizontal distance (step S62) as shown in the flowchart of FIG. 13. The detection of the vertical distance is the detection of the distance from the pixel of interest to one of the high-level pixels positioned vertically relative to the objective pixel which is at the shortest distance from the pixel of interest in the image of FIG. 19, and the detection of the horizontal distance is the detection of the distance from the pixel of interest to one of the high-level pixels positioned horizontally relative to the pixel of interest which is at the shortest distance from the pixel of interest. The detected vertical and horizontal distances are written into positions corresponding to the pixel of interest in a high-level adjacent pixel vertical distance buffer shown in FIG. 20A and a high-level adjacent pixel horizontal distance buffer shown in FIG. 20B, respectively. For example, when the pixel Pt is the pixel of interest in the image of FIG. 19, the high-level adjacent pixel vertical distance $D_{vh}$ and the high-level adjacent pixel horizontal distance $D_{hh}$ are written into the positions corresponding to the pixel of interest Pt in the high-level adjacent pixel vertical distance buffer and high-level adjacent pixel horizontal distance buffer shown in FIGS. 20A and 20B, respectively.

Figure 14:
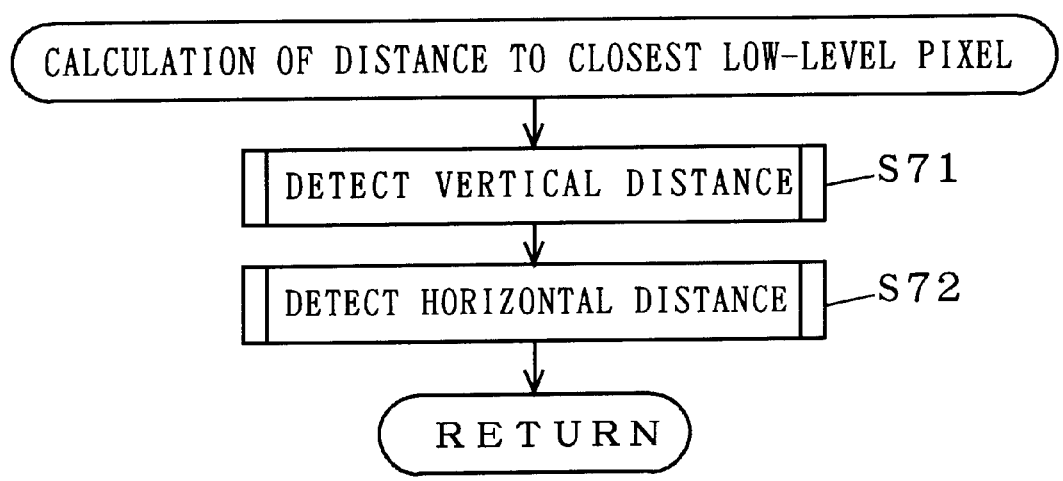
Figure 20C:
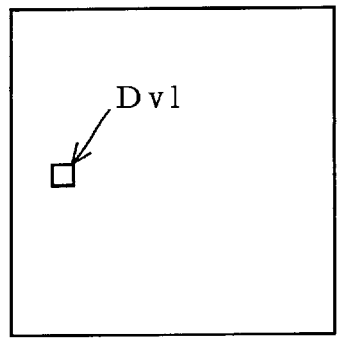
Figure 20D:
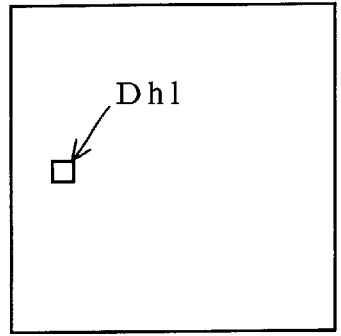

In the step S7, the distance from the pixel of interest to the closest low-level pixel is calculated. The step S7 includes the detection of a vertical distance (step S71) and the detection of a horizontal distance (step S72) as shown in the flowchart of FIG. 14. As in the processing for the high-level pixels, a distance $D_{vl}$ from the pixel of interest to one of the low-level pixels positioned vertically relative to the pixel of interest which is at the shortest distance from the pixel of interest and a distance $D_{hl}$ from the pixel of interest to one of the low-level pixels positioned horizontally relative to the pixel of interest which is at the shortest distance from the pixel of interest are written into positions corresponding to the pixel of interest Pt (FIG. 19) in a low-level adjacent pixel vertical distance buffer shown in FIG. 20C and a low-level adjacent pixel horizontal distance buffer shown in FIG. 20D, respectively.

The four distance buffers shown in FIGS. 20A through 20D are stored in the memory 17.

The detection of the vertical distance (step S61) and the detection of the horizontal distance (step S62) for the high-level pixels are described below. The detection of the vertical distance (step S71) and the detection of the horizontal distance (step S72) for the low-level pixels are similar in processing sequence to those for the high-level pixels except that the pixels to be detected are the low-level pixels instead of the high-level pixels.

Figure 15:
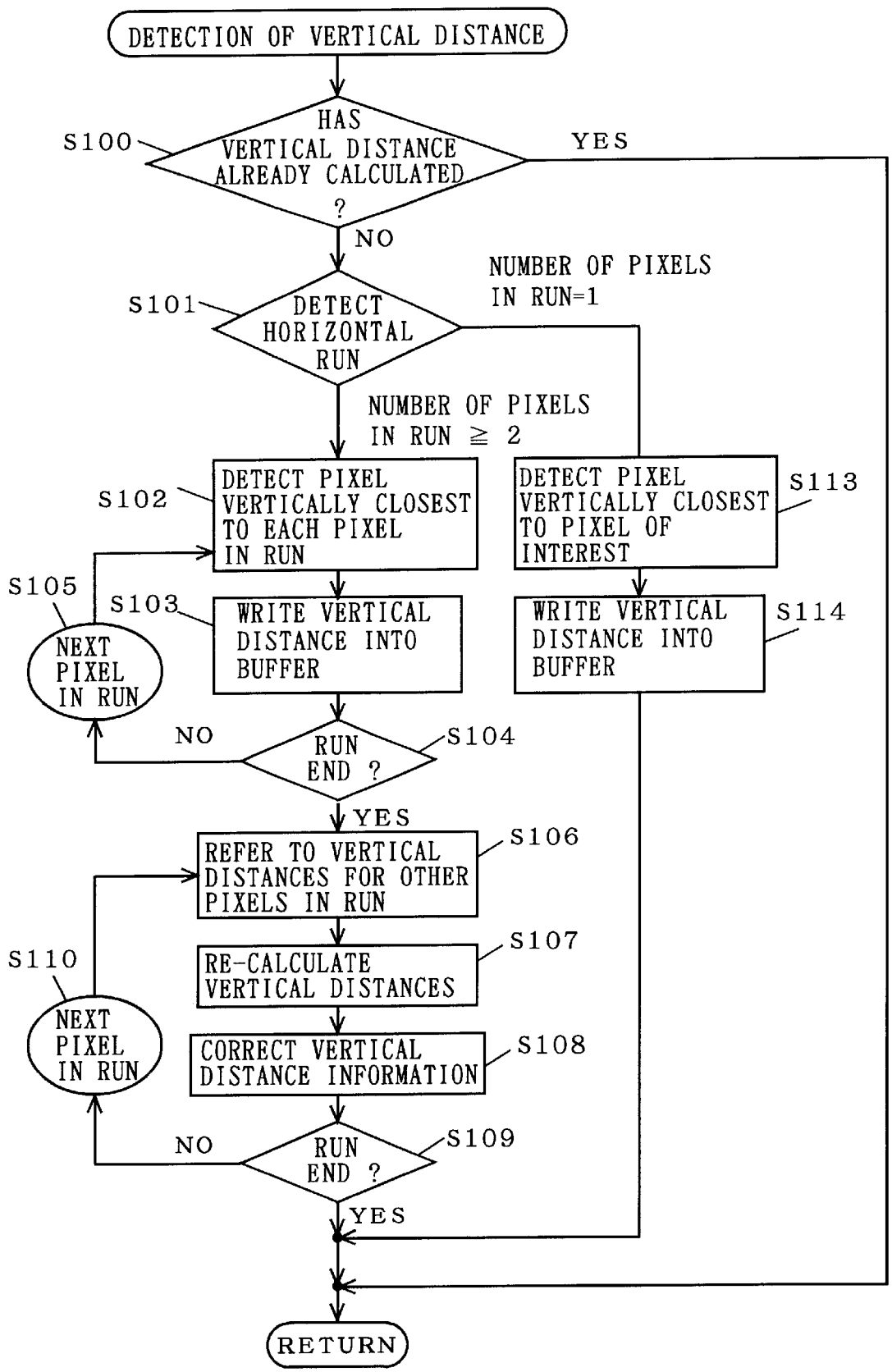

The detection of the vertical distance (step S61) is illustrated in detail in FIG. 15. In the step S100, whether or not the distance from the pixel of interest to the vertically closest high-level pixel has already been calculated is judged. This step is provided to avoid the duplication of the calculation since the distance is calculated based on the above-described array (run) of pixels having the same gradation level and arranged in the horizontal direction and, hence, the vertical distance has already been calculated if the pixel of interest is a pixel constituting the run including another pixel of interest. If the result of judgment in the step S100 is "YES", the processing shown in FIG. 15 is completed.

In the step S101, a run extending in the main scanning direction (X direction) from the pixel of interest Pt of FIG. 19 is extracted, and the number of pixels constituting the extracted horizontal run is determined. If the number of pixels constituting the run equals "1", the flow proceeds to the step S113. If the number of pixels constituting the run is equal to or greater than "2", the flow proceeds to the step S102.

The run comprised of eight pixels as shown in FIG. 10, for example, is described below. In the step S102, the high-level pixel vertically closest to each of the pixels constituting the run is detected. For the run comprised of eight pixels as shown in FIG. 10, the high-level pixel Pv1 vertically closest to the pixel Pt1 constituting the run is detected. In the step S103, the vertical distance D1 between the pixel Pt1 and the high-level pixel Pv1 is written into a position corresponding to the pixel Pt1 in the high-level adjacent pixel vertical distance buffer shown in FIG. 20A. Whether or not the vertical distance information has already been written for all of the pixels constituting the run is judged in the step S104. The flow proceeds to the step S106 if the result of judgment is "YES", and the flow proceeds to the step S105 if the result of judgment is "NO". In the case shown in FIG. 10, since the process for the pixel Pt1 has been completed but the pixels Pt2 to Pt8 have not yet been processed, the flow proceeds to the step S105 to repeat similar processing. In this manner, the high-level pixels Pv1 to Pv8 vertically closest to the pixels Pt1 to Pt8 constituting the run are detected, and the vertical distances D1 to D8 therebetween are written into the corresponding positions in the high-level adjacent pixel vertical distance buffers, respectively.

The vertical distance for the pixel of interest among the pixels constituting the run and the vertical distances for the remaining pixels constituting the run are referred to in the step S106. The first pixel of interest is, for example, the leftmost pixel in the run. The distances from the pixel of interest to the closest pixels to the remaining pixels are calculated in the step S107. A comparison is made between one of the distances which is the shortest as the result of calculation and the vertical distance stored in the high-level adjacent pixel vertical distance buffer of the pixel of interest to select the shorter distance, thereby correcting the vertical distance information corresponding to the pixel of interest in the high-level adjacent pixel vertical distance buffer (step S108).

When the pixel of interest is the pixel Pt1 in the example shown in FIG. 10, the distances from the pixel Pt1 to the pixels Pv2 to Pv8 are calculated. For instance, the distance from the pixel Pt1 to the pixel Pv3 is calculated using Equation (3) described above. Similar equations may be applied to the calculations of the distances to other pixels. The distance to the pixel Pv3 is the shortest distance among the calculation results. Then, the comparison is made between the distance to the pixel Pv3 and the vertical distance D1 stored in the high-level adjacent vertical distance buffer to adopt the distance to the pixel Pv3 which is the shorter. The distance from the pixel Pt1 to the pixel Pv3 is overwritten into the position corresponding to the pixel Pt1 in the high-level adjacent pixel vertical distance buffer.

The steps S109 and S110 are provided to execute the above described processing on all of the pixels constituting the run. Whether or not the above described processing has been executed on all of the pixels constituting the run is judged in the step S109. The detection of the vertical distance is completed if the result of judgment is "YES". The next pixel becomes the pixel of interest if the result of judgment is "NO". For instance, if the pixel Pt1 has been processed, the next pixel Pt2 is similarly processed. The processing is repeated up to the pixel Pt8 until the vertical distance information corresponding to the respective pixels in the high-level adjacent pixel vertical distance buffers is corrected.

If the number of pixels constituting the run is judged as being equal to "1" in the step S101 and the flow proceeds to the step S113, the high-level pixel positioned vertically closest to the pixel of interest is detected. Then, the distance from the pixel of interest to the detected high-level pixel is written into the position corresponding to the pixel of interest in the high-level adjacent pixel vertical distance buffer (step S114). The detection of the vertical distance is completed.

Figure 16:
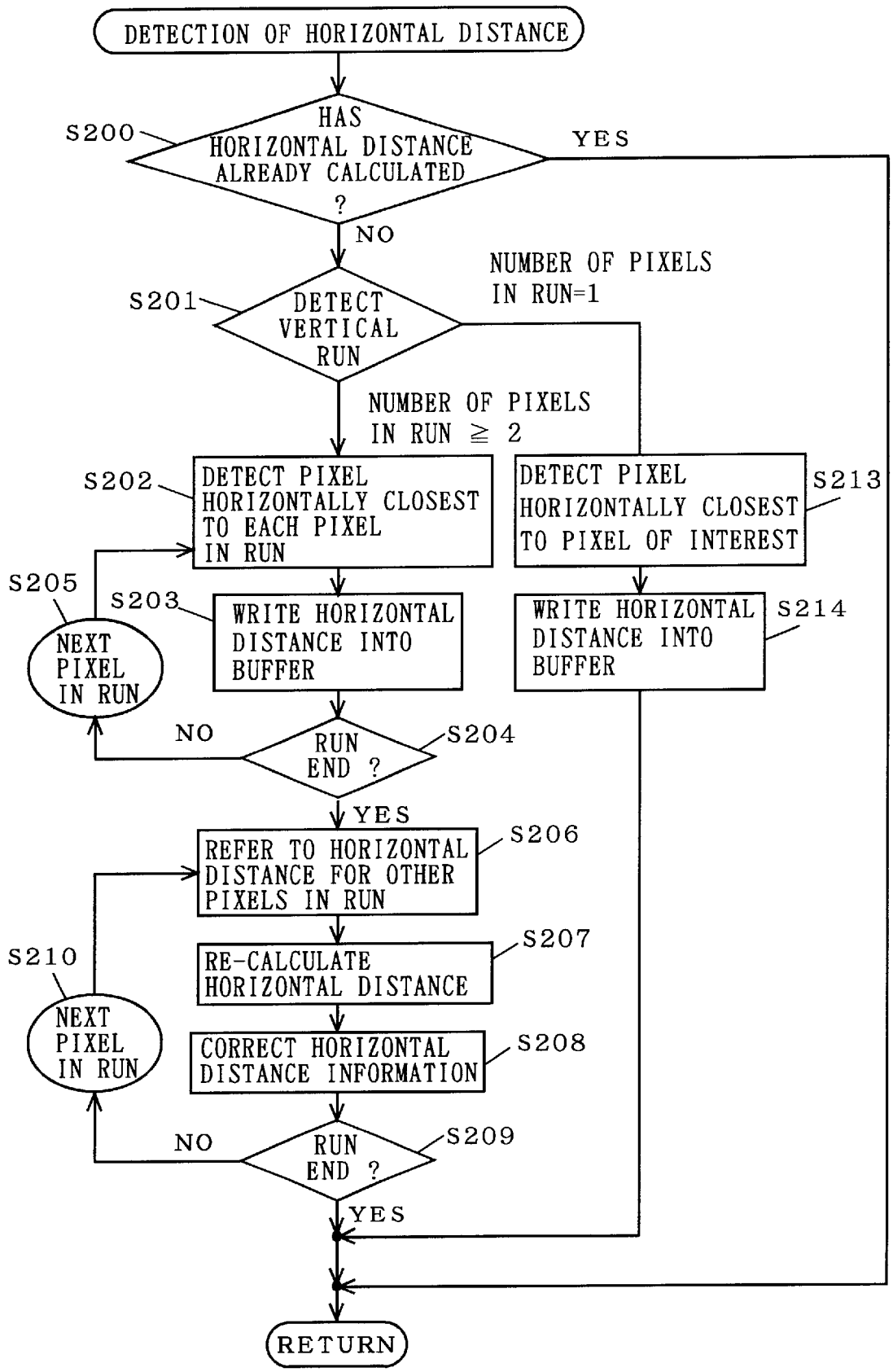

Next, the detection of the horizontal distance (step S62) is discussed below. FIG. 16 is a flowchart of the detection of the horizontal distance (step S62). It will be appreciated that the flowcharts of FIGS. 15 and 16 are generally similar in processing sequence.

In the step S200, whether or not the distance from the pixel of interest to the horizontally closest high-level pixel has already been calculated is judged. This step is provided to avoid the duplication of the calculation since the distance is calculated based on the run of pixels having the same gradation level and arranged in the vertical direction and, hence, the horizontal distance has already been calculated if the pixel of interest is a pixel constituting the vertical run including another pixel of interest. If the result of judgment in the step S200 is "YES", the processing shown in FIG. 16 is completed.

In the step S201, a run extending in the sub-scanning direction (Y direction) from the pixel of interest Pt of FIG. 19 is extracted, and the number of pixels constituting the extracted vertical run is determined. If the number of pixels constituting the run equals "1", the flow proceeds to the step S213. if the number of pixels constituting the run is equal to or greater than "2", the flow proceeds to the step S202.

In the step S202, the high-level pixel horizontally closest to each of the pixels constituting the run is detected. In the step S203, the horizontal distance D1 between the pixel of interest and the high-level pixel therefor is written into the high-level adjacent pixel horizontal distance buffer shown in FIG. 20B. Whether or not the horizontal distance information has already been written for all of the pixels constituting the vertical run is judged in the step S204. The flow proceeds to the step S206 if the result of judgment is "YES", and the flow proceeds to the step S205 if the result of judgment is "NO".

The horizontal distance for the pixel of interest among the pixels constituting the run and the horizontal distances for the remaining pixels constituting the run are referred to in the step S206. The first pixel of interest is, for example, the uppermost pixel in the run. The distances from the pixel of interest to the closest pixels to the remaining pixels are calculated in the step S207. A comparison is made between one of the distances which is the shortest as the result of calculation and the horizontal distance stored in the high-level adjacent pixel horizontal distance buffer of the pixel of interest to select the shorter distance, thereby correcting the horizontal distance information corresponding to the pixel of interest in the high-level adjacent pixel horizontal distance buffer (step S208).

The steps S209 and S210 are provided to execute the above described processing on all of the pixels constituting the run. Whether or not the above described processing has been executed on all of the pixels constituting the run is judged in the step S209. The detection of the horizontal distance is completed if the result of judgment is "YES". The next pixel becomes the pixel of interest if the result of judgment is "NO".

If the number of pixels constituting the run is judged as being equal to "1" in the step S201 and the flow proceeds to the step S213, the high-level pixel positioned horizontally closest to the pixel of interest is detected. Then, the distance from the pixel of interest to the detected high-level pixel is written into the position corresponding to the pixel of interest in the high-level adjacent pixel horizontal distance buffer (step S214). The detection of the horizontal distance (step S62), and the calculation of the distance to the closest high-level pixel shown in FIG. 12 (step S6) are completed.

Subsequently, the distance from the pixel of interest to the closest low-level pixel is calculated in the step S7. As above mentioned, the detection of the vertical distance (step S71) for the low-level pixels shown in FIG. 14 is similar to that illustrated in the flowchart of FIG. 15 described for the high-level pixels. The detection of the horizontal distance (step S72) for the low-level pixels is similar to that illustrated in the flowchart of FIG. 16. It should be noted that the vertical distance to the low-level adjacent pixel is stored in the low-level adjacent pixel vertical distance buffer shown in FIG. 20C, and the horizontal distance thereto is stored in the low-level adjacent pixel horizontal distance buffer shown in FIG. 20D.

Figure 17:
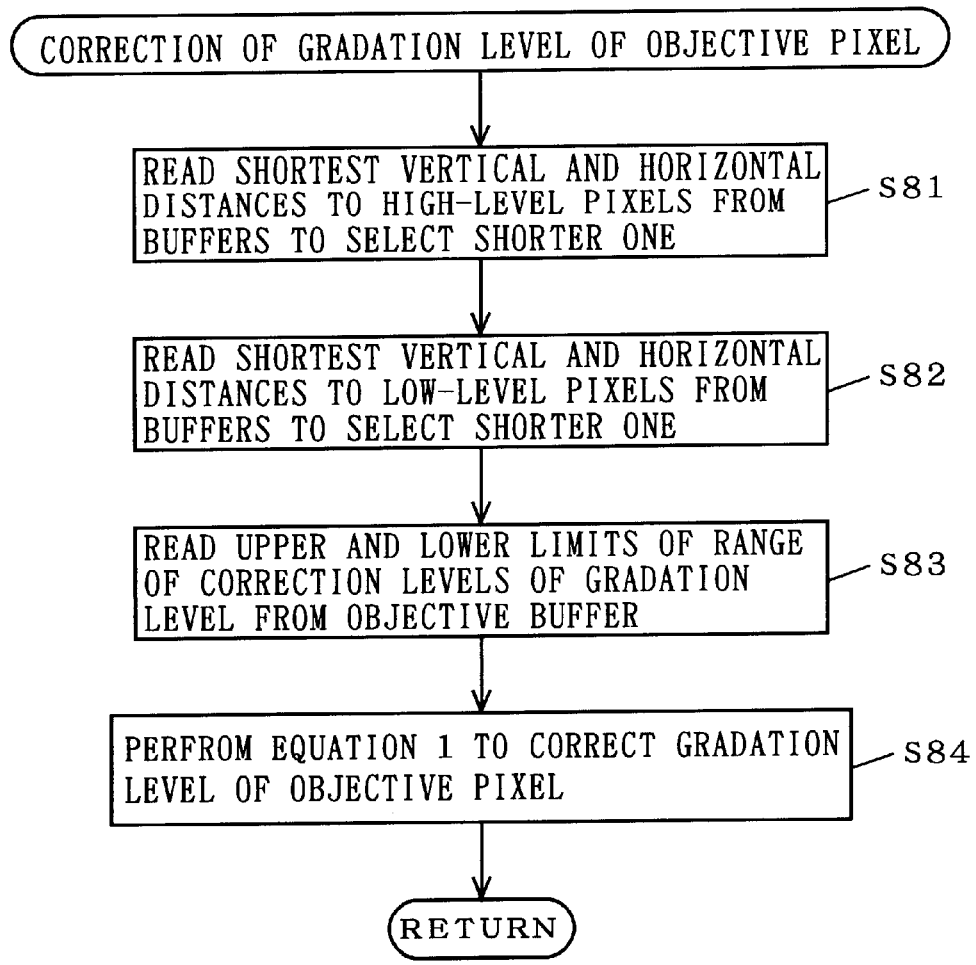

In the step S8, the gradation level of the objective pixel (pixel of interest) is corrected. FIG. 17 is a flowchart showing the correction of the gradation level in the step S8. First, in the step S81, the vertical distance $D_{vh}$ for the objective pixel (pixel of interest) stored in the high-level adjacent pixel vertical distance buffer and the horizontal distance $D_{hh}$ for the objective pixel (pixel of interest) stored in the high-level adjacent pixel horizontal distance buffer are read, and one of the distances $D_{vh}$ and $D_{hh}$ which is shorter is selected as the high-level distance $D_{high}$. In the step S82, the vertical distance $D_{vl}$ for the objective pixel (pixel of interest) stored in the low-level adjacent pixel vertical distance buffer and the horizontal distance $D_{hl}$ for the objective pixel (pixel of interest) stored in the low-level adjacent pixel horizontal distance buffer are read, and one of the distances $D_{vl}$ and $D_{hl}$ which is shorter is selected as the low-level distance $D_{low}$. In the step S83, the upper limit $L_{high}$ and lower limit $L_{low}$ of the range of correction levels of the gradation level of the objective pixel are read from the objective buffer. The gradation level of the objective pixel is corrected to the gradation level L calculated from Equation (1). The correction of the gradation level of the objective pixel (pixel of interest) (step S8) is completed.

Thereafter, whether or not the pixel of interest is the last pixel for scanning of the full image is judged in the step S9. If it is not the last pixel, the pixel of interest is changed to the next pixel in the step S10, and the processing in the steps S5 to S9 is repeated. If it is the last pixel, the flow proceeds to the step S11.

In the step S11, the image subjected to the gradation level interpolation is outputted to a predetermined output unit. The output unit includes the display shown in FIG. 7, a printer connected to the interface 11, and the like. Upon completion of the image output, the gradation level interpolation of the image is terminated.

The above described processing is capable of extracting the high-level and low-level pixels based on the run, and allows the large area to be searched in a relatively even image with a relatively small gradation change, and the small area to be searched in a relatively uneven image with a relatively large gradation change. The area to be searched is automatically changed depending upon the images to be subjected to the interpolation.

Figure 21A:
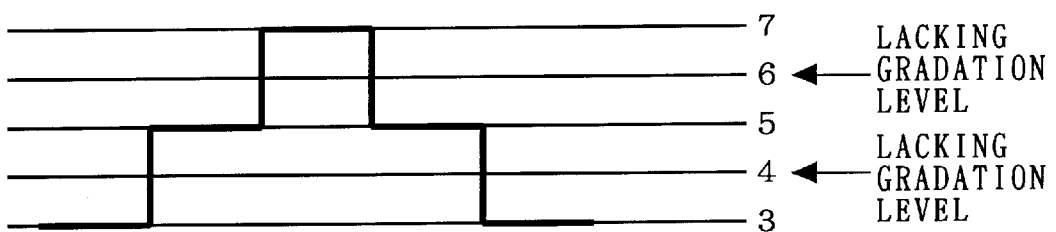
FIGS. 21A and 21B show an image which is lacking in gradation levels.
Figure 21B:
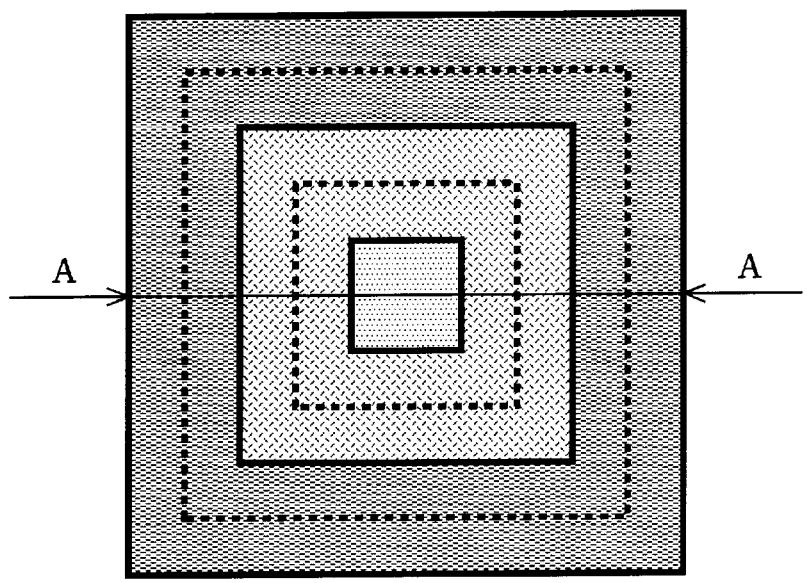
Figure 22A:
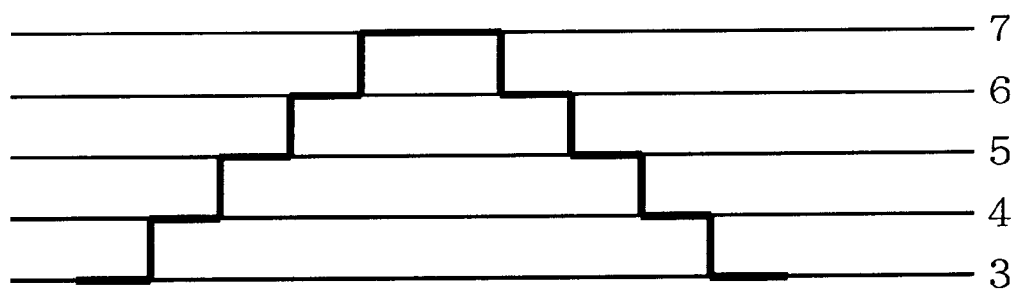
FIGS. 22A and 22B show an image provided by performing the gradation level interpolation on the image of FIGS. 21A and 21B according to the preferred embodiment of the present invention.
Figure 22B:
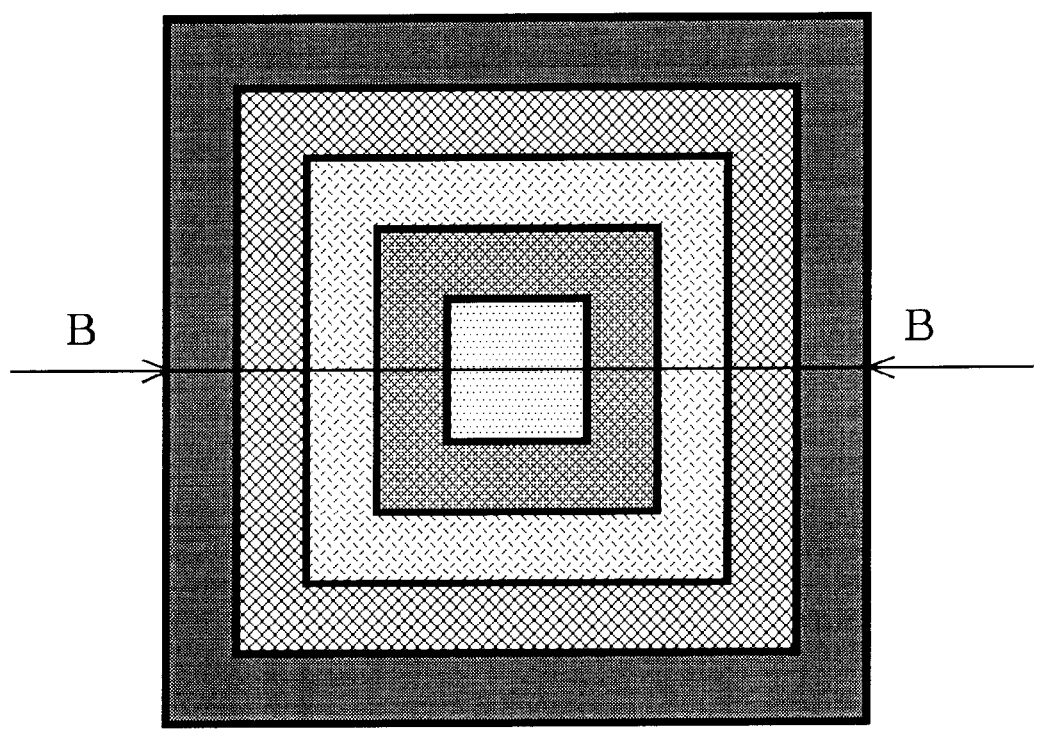

An image shown in FIG. 21B will be contemplated. FIG. 21A shows the gradation levels of the image in cross-section taken along the line A—A of FIG. 21B. It is appreciated from FIGS. 21A and 21B that the gradation levels "4" and "6" are lacking in the image. The result of the above described gradation level interpolation performed upon the image of FIGS. 21A and 21B is shown in FIGS. 22A and 22B. FIG. 22B shows the image subjected to the gradation level interpolation, and FIG. 22A shows the gradation levels of the image in cross-section taken along the line B—B of FIG. 22B. It will be found from FIGS. 22A and 22B that the gradation level interpolation of this preferred embodiment of the present invention interpolates the gradation levels "4" and "6" lacking in the image of FIGS. 21A and 21B to smooth the gradation level changes in the image without producing pseudo outlines. Additionally, the selection of the pixel having the gradation level adjacent the lacking gradation level and the determination of the gradation level of that pixel based on the positional relationship between other high-level and low-level pixels within the image plane prevent the gradation levels of pixels which are not to be interpolated from being processed and changed which leads to degradation of the quality of the image.

The use of the gradation levels of the detected closest high-level and low-level pixels as the upper and lower limits $L_{high}$ and $L_{low}$ for use in Equation (1) for correction of the gradation level of the objective pixel might cause the reversal of the gradation levels to produce a blurred image since the used gradation levels are not necessarily the high and low gradation levels adjacent the lacking gradation level in the histogram. The preferred embodiment of the present invention, however, significantly differs from the conventional image smoothing in detecting the gradation level to be interpolated using the histogram, previously determining the upper and lower limits of the range of correction levels of the gradation level to store the upper and lower limits in the objective buffers of the memory 17, and calculating Equation (1) based on the upper and lower limits $L_{high}$ and $L_{low}$ stored in the objective buffers. This prevents the blurred image resulting from the reversal of the gradation levels.

Therefore, the processing of this preferred embodiment may interpolate the gradation levels while maintaining the sharpness of the edges of the image at which a large gradation level difference should exist and preventing the original image from being roughened in a smooth image section.

According to the above description, this preferred embodiment may be regarded as the processing for making variable the area to be smoothed for each place within the image plane in accordance with the local spatial change rate of gradation levels. Specifically, the area to be smoothed is increased when the spatial change rate of gradation levels is low, and is decreased when the spatial change rate of gradation levels is high, whereby the area with gentle gradation level changes is sufficiently smoothed and the edge area is smoothed without losing its sharpness.

6. Variation

The lack of gradation levels throughout the image is described above. However, the present invention may be applied to the smoothing of a partial area of the full image (e.g., a partial image of human skin) by producing a histogram for the partial image area, detecting a lacking gradation level in the histogram, and interpolating the lacking gradation level.

While the invention has been described in detail, the foregoing description is in all aspects illustrative and not restrictive. It is understood that numerous other modifications and variations can be devised without departing from the scope of the invention.

We claim:

1. A method of interpolating gradation levels of an original image, comprising the steps of:
   (a) serially selecting an objective pixel from said original image;
   wherein the step of serially selecting further comprises the steps of:
   (a-1) obtaining said gradation distribution of said original image;

(a-2) detecting existent pixels having original gradation levels which exist in said original image and whose adjacent gradation levels in said gradation distribution do not exist in said original image; and (a-3) serially selecting said objective pixel among said existent pixels; and (b) interpolating original gradation levels of neighboring pixels which are present in the neighborhood of said objective pixel, to determine a corrected gradation level of said objective pixel within a limited correction range, wherein said limited correction range is defined by limit values which are nearest to said original gradation level of said objective pixel among original gradation levels existing in a gradation distribution of said original image.

2. A method of interpolating gradation levels of an original image, comprising the steps of:

(a) serially selecting an objective pixel from said original image; and (b) interpolating original gradation levels of neighboring pixels which are present in the neighborhood of said objective pixel, to determine a corrected gradation level of said objective pixel within a limited correction range, wherein the step of interpolating further comprises the steps of:

(b-1) selecting said neighboring pixels among pixels having original gradation levels different from an original level of said objective pixel to determine reference pixels; and (b-2) interpolating original gradation levels of said reference pixels to obtain said interpolated gradation level of said objective pixel;

wherein said limited correction range is defined by limit values which are nearest to said original gradation level of said objective pixel among original gradation levels existing in a gradation distribution of said original image.

3. The method in accordance with claim 2, wherein the step (b-1) comprises the step of:

(b-1-1) finding said neighboring pixels in predetermined positive and negative directions from said objective pixel on said original image.

4. The method in accordance with claim 3, wherein the step (a) comprises the step of:

(a-1) scanning said original image in a predetermined scanning direction to serially select said objective pixel among said original image, and said predetermined positive and negative directions are determined in response to said scanning direction.

5. The method in accordance with claim 2, wherein the step (b-1) comprises the step of:

(b-1-1) detecting a series of pixels which are contiguous from said objective pixel and have a same original gradation level as said objective pixel;

(b-1-2) searching said original image for tentative reference pixels in predetermined positive and negative directions from each pixel among said series of pixels on said original image to determine said tentative reference pixels; and (b-1-3) selecting said reference pixels among said tentative pixels.

6. An apparatus for interpolating gradation levels of an original image, comprising:

(a) selection means for serially selecting an objective pixel from said original image, wherein said selection means further comprises:

(a-1) means for obtaining said gradation distribution of said original image;

(a-2) means for detecting existent pixels having original gradation levels which exist in said original image and whose adjacent gradation levels in said gradation distribution do not exist in said original image;

(a-3) means for serially selecting said objective pixel among said existent pixels; and (b) interpolation means for interpolating original gradation levels of neighboring pixels which are present in the neighborhood of said objective pixel, to determine a corrected gradation level of said objective pixel within a limited correction range;

wherein said limited correction range is defined by limit values which are nearest to said original gradation level of said objective pixel among original gradation levels existing in a gradation distribution of said original image.

7. An apparatus for interpolating gradation levels of an original image, comprising:

(a) selection means for serially selecting an objective pixel from said original image; and (b) interpolation means for interpolating original gradation levels of neighboring pixels which are present in the neighborhood of said objective pixel, to determine a corrected gradation level of said objective pixel within a limited correction range, wherein said interpolation means further comprises:

(b-1) selecting means for selecting said neighboring pixels among pixels having original gradation levels different from an original level of said objective pixel to determine reference pixels; and (b-2) means for interpolating original gradation levels of said reference pixels to obtain said interpolated gradation level of said objective pixel;

wherein said limited correction range is defined by limit values which are nearest to said original gradation level of said objective pixel among original gradation levels existing in a gradation distribution of said original image.

8. The apparatus in accordance with claim 7, wherein said selecting means comprises:

(b-1-1) means for finding said neighboring pixels in predetermined positive and negative directions from said objective pixel on said original image.

9. The apparatus in accordance with claim 8, wherein said selection means comprises:

(a-1) means for scanning said original image in a predetermined scanning direction to serially select said objective pixel among said original image, and said predetermined positive and negative directions are determined in response to said scanning direction.

10. The apparatus in accordance with claim 7, wherein said selecting means comprises:

(b-1-1) means for detecting a series of pixels which are contiguous from said objective pixel and have a same original gradation level as said objective pixel;

(b-1-2) means for searching said original image for tentative reference pixels in predetermined positive and negative directions from each pixel among said series of pixels on said original image to determine said tentative reference pixels; and (b-1-3) means for selecting said reference pixels among said tentative pixels.

\* \* \* \* \*